United States Patent
Mercier et al.

(10) Patent No.: US 9,997,931 B2
(45) Date of Patent: Jun. 12, 2018

(54) DEVICE FOR BALANCING THE CHARGE OF THE ELEMENTS OF A POWER BATTERY

(71) Applicant: COMMISSARIAT A L'ENERGIE ATOMIQUE ET AUX ENERGIES ALTERNATIVES, Paris (FR)

(72) Inventors: Sylvain Mercier, Saint Egreve (FR); Daniel Chatroux, Teche (FR); Matthieu Desbois-Renaudin, Villard de Lans (FR); Laurent Garnier, Marennes (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 34 days.

(21) Appl. No.: 14/911,221

(22) PCT Filed: Jul. 24, 2014

(86) PCT No.: PCT/EP2014/065976
§ 371 (c)(1),
(2) Date: Feb. 9, 2016

(87) PCT Pub. No.: WO2015/024731
PCT Pub. Date: Feb. 26, 2015

(65) Prior Publication Data
US 2016/0197498 A1    Jul. 7, 2016

(30) Foreign Application Priority Data
Aug. 20, 2013  (FR) ..................... 13 58062

(51) Int. Cl.
H02J 7/00        (2006.01)

(52) U.S. Cl.
CPC ............ *H02J 7/0019* (2013.01); *H02J 7/007* (2013.01); *H02J 7/0018* (2013.01); *H02J 7/0021* (2013.01); *Y02T 10/7055* (2013.01)

(58) Field of Classification Search
CPC ...... H02J 7/0018; H02J 7/0019; H02J 7/0021; H02J 7/007
(Continued)

(56) References Cited

U.S. PATENT DOCUMENTS

| 4,717,833 A | 1/1988 | Small |
| 2005/0017682 A1* | 1/2005 | Canter ................. H02J 7/0021 320/118 |

(Continued)

FOREIGN PATENT DOCUMENTS

| CN | 101521083 A | 9/2009 |
| FR | 2 959 887 A1 | 11/2011 |
| FR | 2 982 090 A1 | 5/2013 |

OTHER PUBLICATIONS

George Altemose, et al., "Active Cell Balancing System using an Isolated Share Bus for Li-Ion Battery Management: Focusing on Satellite Applications," IEEE, XP031880716, May 6, 2011 (7 pages).

(Continued)

*Primary Examiner* — Nathaniel Pelton
(74) *Attorney, Agent, or Firm* — Oblon, McClelland, Maier & Neustadt, L.L.P.

(57) ABSTRACT

A device for balancing charge of an electric power storage device including: a plurality of electrical storage elements connected in series including at least two current limiting DC/DC converters each including: an input configured to be connected to terminals of a respective storage element; an output configured to be connected to an electrical network having a voltage controlled at a lower level than the voltage at the terminals of the storage device; a transformation law (Continued)

of following type: Vout=K1*Ve−f(I) for I<=1 lim, in which Vout is potential difference at the output, K1 is a constant, Ve is potential difference at the input, f(I) is an affine function of current I delivered at the output, and 1 lim is current limitation of the converter.

14 Claims, 5 Drawing Sheets

(58) Field of Classification Search
USPC .................................................. 320/101, 107
See application file for complete search history.

(56) References Cited

U.S. PATENT DOCUMENTS

| | | | | |
|---|---|---|---|---|
| 2007/0279003 | A1* | 12/2007 | Altemose | H02J 7/0016 320/118 |
| 2013/0076310 | A1* | 3/2013 | Garnier | H02J 7/0016 320/118 |
| 2014/0312844 | A1* | 10/2014 | Mercier | H02J 1/102 320/118 |

OTHER PUBLICATIONS

William Chen, et al., "Design of an Auxiliary Power Distribution Network for an Electric Vehicle," The First IEEE International Workshop on Electronic Design, Test and Applications Proceedings, 2002, (5 pages).

"Battery performance Characteristics," httpp://www.mpoweruk.com/performance.htm, Woodbank Communications Ltd, 2005 (9 pages).

Murata Power Solutions, "HPH-12/30-D48 Series, Isolated, 12 Vout, 30A, Half-Brick DC/DC Converters," www.murata-ps.com, MDC_HPH-12/30-D48.A02, May 27, 2011, pp. 1-13.

International Search Report dated Apr. 29, 2015 in PCT/EP2014/065976 filed Jul. 24, 2014.

* cited by examiner

DEVICE FOR BALANCING THE CHARGE OF THE ELEMENTS OF A POWER BATTERY

The invention relates to a charge-balancing device for a power battery with electrochemical accumulators.

DC voltage high-power electrical systems are undergoing significant development. Indeed, numerous transport systems include a DC voltage power supply.

Hybrid combustion/electric or electric vehicles notably include high-power batteries. Such batteries are employed to drive an AC electric motor by means of an inverter. The voltage levels required for such motors reach many hundreds of volts, typically of the order of 400 volts. Such batteries also comprise a high capacity in order to boost the autonomy of the vehicle in electric mode.

To obtain high powers and capacities, multiple groups of accumulators are placed in series. The number of stages (number of groups of accumulators) and the number of accumulators in parallel in each stage vary depending on the voltage, current and capacity desired for the battery. The association of multiple accumulators is called a battery of accumulators. The electrochemical accumulators used for such vehicles are generally of the lithium ion (Li-ion) type because of their ability to store a large amount of energy at a restrained weight and volume. The technologies for batteries of lithium-ion iron phosphate, LiFePO4, type are the subject of significant developments due to a high level of intrinsic safety, at the expense of a slightly reduced energy storage density. An electrochemical accumulator typically has a nominal voltage of the following order of magnitude:

3.3 V for lithium-ion iron phosphate, LiFePO4, technology, 4.2 V for technology of lithium-ion type based on cobalt oxide. The invention can also be applied to supercapacitors.

The charging or discharging of an accumulator respectively translates into an increase or decrease of the voltage across its terminals. An accumulator is considered to be charged or discharged once it has reached a level of voltage defined by its electrochemical process. In a circuit employing multiple stages of one or more accumulators, the current flowing through the stages is the same. The level of charge or of discharge of the stages therefore depends on the intrinsic characteristics of the accumulators. Voltage differences between the stages appear during charging or discharging due to disparities in manufacture, in aging, in assembly and in operating temperature between the various accumulators.

For an accumulator with Li-ion technology, an overly high or overly low voltage, known as a threshold voltage, may damage or destroy the accumulator. For example, overcharging a Li-ion accumulator based on cobalt oxide may lead to its thermal runaway and a fire breaking out. For a Li-ion accumulator based on iron phosphate, overcharging translates into a decomposition of the electrolyte which decreases its lifespan or leads to its deterioration. An overly heavy discharge which leads to a voltage of lower than 2 V, for example, principally leads to an oxidation of the current collector of the negative electrode when this electrode is made of copper and therefore a deterioration of the accumulator. Consequently, monitoring the voltages across the terminals of each stage of one or more accumulators is obligatory during charging and discharging for reasons of safety and reliability. A monitoring device is thus generally placed in parallel with each stage and makes it possible to ensure this function.

A function of the monitoring device is to monitor the charge state (or the residual charge) of each stage of one or more accumulators and to transmit the information to a monitoring circuit in order to stop the charging or discharging of the battery once a stage has reached its threshold voltage. However, on a battery with multiple stages of one or more accumulators arranged in series, if charging is stopped when the most charged stage reaches its threshold voltage, then the other stages may not be completely charged. Conversely, if discharging is stopped when the most discharged stage reaches its threshold voltage, then the other stages may not be completely discharged. The capacity of each stage of one or more accumulators is consequently not exploited, which represents a major problem in applications involving transport with onboard batteries and having highly restricted autonomy. To overcome this problem, the monitoring device is generally associated with a charge-balancing device.

A function of the balancing device is to optimize the charging of the battery and therefore its autonomy by bringing the stages of one or more accumulators placed in series to an identical charge or discharge state. Two categories of balancing devices exist: energy-dissipation balancing devices, or energy-transfer balancing devices.

With energy-dissipation balancing systems, the voltage across the terminals of the stages is homogenized by diverting the charge current of one or more stages having reached the threshold voltage and by dissipating the energy in a resistor. In a variant, the voltage across the terminals of the stages is homogenized by discharging one or more stages having reached the upper threshold voltage.

However, such energy-dissipation balancing systems have the major drawback of consuming more energy than required for charging the battery. Indeed, it is necessary to discharge multiple accumulators or shunt the charge current from multiple accumulators so that the last accumulator(s) which is/are slightly less charged finish charging. The dissipated energy may therefore be much greater than the energy of the one or more charging operations still to be carried out. Additionally, they dissipate the excess energy as heat, which is not compatible with the integration constraints in transport and onboard application types, and which induces a severe decrease in the lifespan of the accumulators when the temperature increases.

Regarding energy-transfer balancing systems, they exchange energy between the accumulator stages and the auxiliary battery or an auxiliary energy network.

The energy transfer can be carried out either unidirectionally, for example from the battery to the stages or from the stages to the battery, or bidirectionally, from the auxiliary battery to the stages and from the stages to the auxiliary battery, or even between adjacent stages.

To limit or divide the power supplied by a stage during energy transfers, patent application FR2982090 describes an improved balancing device. An electrical energy storage device comprises multiple stages electrically connected in series. Each stage is connected to the input of a respective DC/DC converter. Each converter supplies a current-limited constant isolated output voltage. The converter outputs are connected in parallel to the auxiliary network. The value of the output voltage of each converter is defined by an instruction supplied by a common command device. Each converter comprises a closed loop for regulating its output voltage in order to supply the constant output voltage defined by the command circuit. The higher the residual charge of a stage, the higher the instruction voltage supplied by the control device to this stage. Consequently the converters, the respective stages of which have the highest residual charge, prioritize the supply of current to the auxiliaries by means of their output.

The structure of the converters is relatively complex, resulting in a non-negligible extra cost. Furthermore, the operation of the device remains relatively complex and requires the recovery of charge information from the stages, and the processing of this information by the command circuit in order to be able to optimize the balancing of charge by supplying power to the auxiliary circuit. Such a charge-balancing device is furthermore vulnerable in the event of malfunctioning of the command circuit.

Document US2005/017682 describes DC/DC converters the input of which is connected to a stage of accumulators. The output voltage of each converter decreases in proportion to the current drawn until reaching a zero voltage. The output of such converters is connected to a common bus which sets a reference voltage. By means of bidirectional converters, the most charged stages recharge the least charged stages. Such converters include an output resistor Rpar resulting in unwanted heating in proximity to the batteries. The assembly of converters for which the output voltage is initially greater than the reference voltage on the common bus, simultaneously draw current on this common bus.

The invention aims to overcome one or more of these drawbacks. The invention thus pertains to a device for balancing the charge of an electrical power storage device including multiple electrical storage elements connected in series, such as defined in the appended claims. The invention also pertains to an electrical power supply system, such as defined in the appended claims.

Other features and advantages of the invention will clearly emerge from the description set forth below by way of entirely non-limiting example, with reference to the drawings in which.

Figure 9:
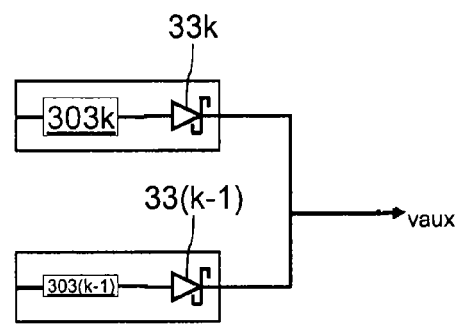
Figure 10:
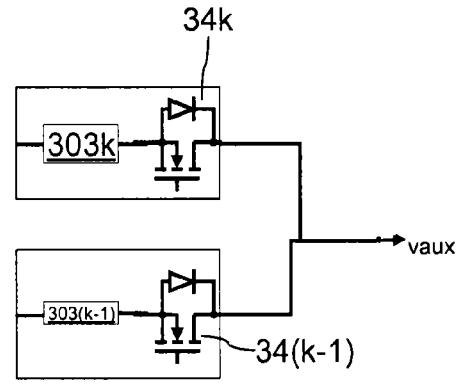
Figure 11:
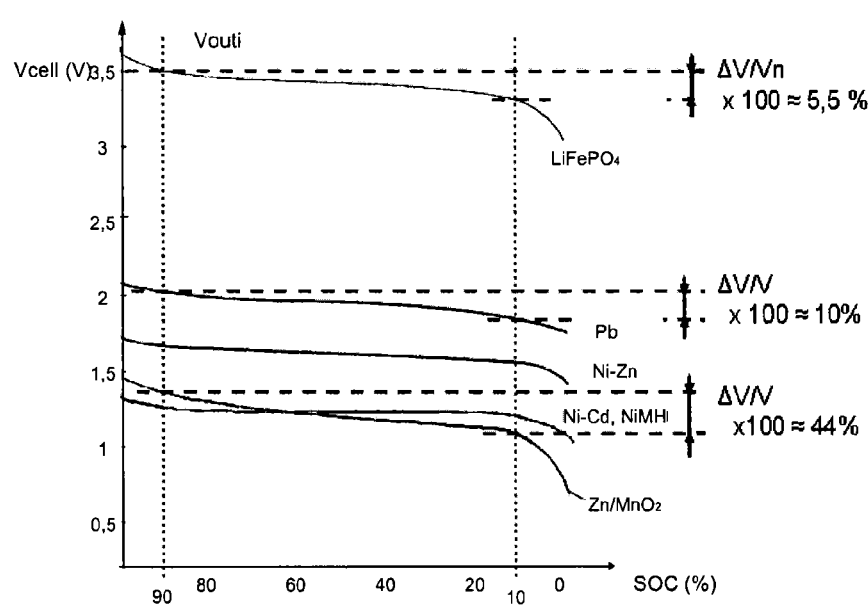
Figure 12:
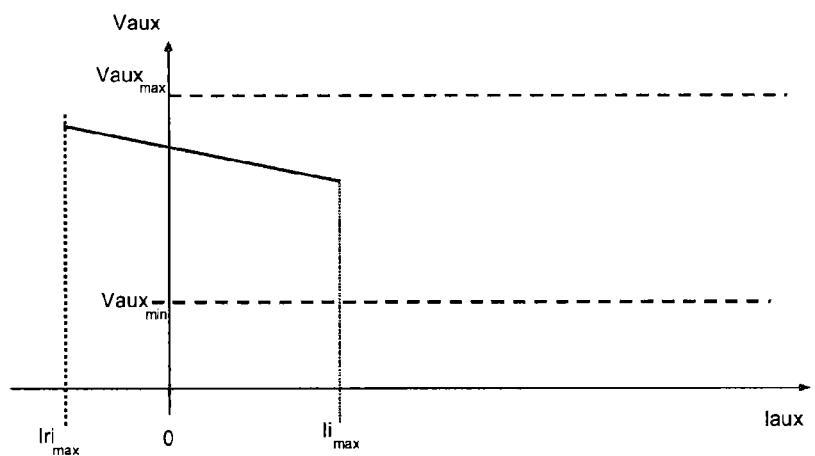

FIG. 9 diagrammatically illustrates exemplary converters for unidirectional current conduction;

FIG. 10 illustrates exemplary converters for unidirectional or bidirectional current conduction;

FIG. 11 illustrates different discharge diagrams typical of different electrochemical accumulator technologies;

FIG. 12 illustrates an exemplary law for the control of output voltage/output current for a bidirectional converter.

Figure 1:
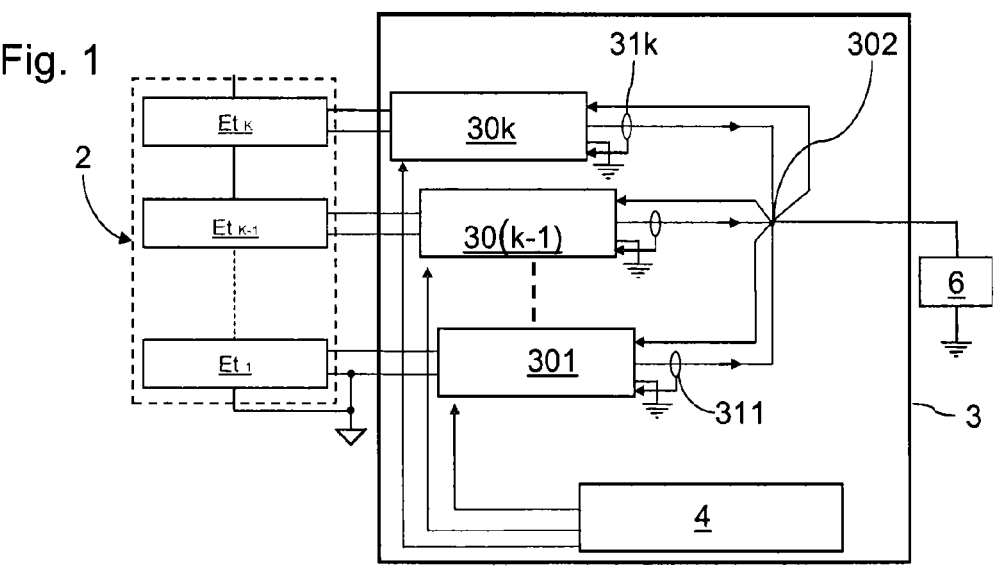
FIG. 1 is a diagrammatic representation of an exemplary electrical power supply system including a charge-balancing device implementing the invention.
Figure 2:
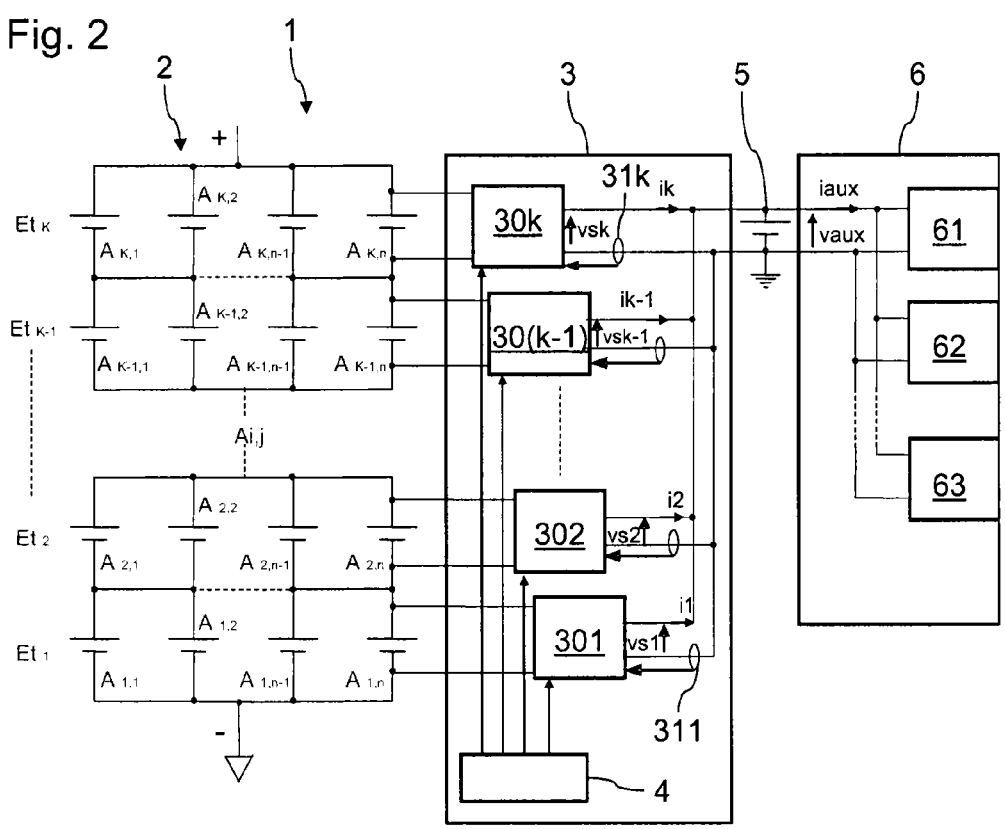
FIG. 2 illustrates in greater detail the electrical power supply system of FIG. 1.

FIGS. 1 and 2 are diagrammatic representations of an electrical power supply system 1 including an electrical energy storage system in the form of a power battery 2. The battery 2 comprises k stages $Et_1$ to $Et_k$, forming k electrical energy storage elements, electrically connected in series (where k is at least equal to 2, preferentially at least equal to 3). Each stage i advantageously includes n accumulators $A_{i,1}$ to $A_{i,n}$ electrically connected in parallel (where n is at least equal to 2). The electrical power supply system 1 also includes a device for balancing the charge 3 of the battery 2. The voltage between the positive terminal and the negative terminal of the battery 2 has a value typically of between 100 V and 750 V, for example of the order of 400 V. The battery 2 is for example intended to supply power to the motor of a hybrid or electric vehicle by being connected to the terminals of an inverter, and is advantageously isolated from the metallic chassis of such a vehicle.

The balancing device 3 comprises a connection interface configured to be connected to the terminals of each of the stages or elements $Et_i$. The balancing device 3 also comprises a connection interface configured to be connected to an auxiliary network 6, for example an onboard electrical network of a vehicle, the voltage of which is generally regulated to a value close to 12 V. This regulated voltage can for example vary in a span of between 10.5 V and 14 V. This regulated voltage is typically at least six times smaller than the voltage across the terminals of the battery 2.

The balancing device 3 comprises converters 301 to 30k, for example a converter per stage of the battery 2. Provision can also be made for a converter for multiple stages in series of the battery 2. The converters 301 to 30k are advantageously isolated. The converters 301 to 30k can be unidirectional or bidirectional. As described further on, the converters 301 to 30k are intended both to ensure the balancing of the stages $Et_i$ of the battery 2 (and thereby to optimize the charging of this power battery 2) and to supply power to the auxiliary network 6, by respectively applying output voltages vs1 to vsk and by supplying output amperages i1 to ik. The output of each of the converters 301 to 30k is connected to the auxiliary network 6 to apply one and the same potential difference vaux across the terminals of the auxiliary network 6. The balancing device 3 supplies a current iaux to the auxiliary network 6. Auxiliary loads 61 to 63 such as an air conditioner or a car radio are connected to the network 6.

The balancing device 3 also includes a control module 4 connected to the converters 30i. The balancing device 3 typically applies binary activation or deactivation commands to each of the converters 30i. An auxiliary battery 5 (or a capacitor, or a supercapacitor) is advantageously connected to the terminals of the network 6. The auxiliary battery 5 or the capacitor make it possible to stabilize the voltage across the terminals of the auxiliary network 6.

The converters 301 to 30k are designed as current-limited voltage sources. A converter 30i has a current limitation denoted by Iimax. Each converter 30i recovers the amperage value Ii which it supplies over its output to the auxiliary network 6. To this end, each converter 30i comprises a current sensor 31i measuring the current Ii which it supplies over its output.

Furthermore, each of the converters 30i has a transformation law of the type:

$$Vouti = K1 \cdot Vei - f(Ii)$$

Where:

Vouti is the output voltage of the converter 30$i$;

K1 is a constant;

Vei is the input voltage of the converter 30$i$;

Ii is the output current drawn by the converter 30$i$;

f(Ii) is an affine function of the current Ii.

The use of a function f(Ii) to define the voltage Vouti makes it possible to facilitate the distribution of current between multiple converters, in the operation subsequently detailed.

In a particular case, f(Ii)=K2*Ii, where K2 is a constant. The amplitude of the function f(Ii) can also be defined so that f(Ii)<0.1*K1*Veimin, where Veimin is a minimum input voltage to be applied to the input of the converter 30$i$.

The control law is defined for the average current Ii. Advantageously, the converter 30$i$ is a voltage step-down converter, which implies K1<1. The constant K1 can be fixed depending on the number of accumulator stages to the terminals of which a converter 30$i$ is connected, depending on their technology and depending on the order of magnitude of the desired voltage on the auxiliary network 6.

This transformation law is ensured as long as the current drawn by the converter 30$i$ is smaller than its current Iimax. Beyond the current Iimax, each of the converters may operate by regulation of current. The value of the output voltage Vouti is thus not defined by the command circuit 4, but determined autonomously by the converter 30$i$. The system may include a monitoring device (not illustrated), monitoring each of the voltages Vei. When this monitoring device identifies a voltage Vei smaller than a lower threshold or greater than an upper threshold, this device can deactivate or activate the corresponding converter Vei or transmit the information to the command circuit 4.

Figure 3:
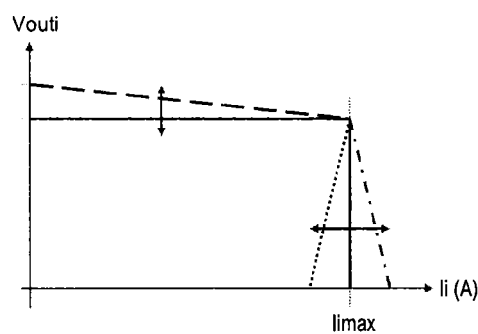
FIG. 3 illustrates exemplary laws for the control of output voltage/output current of a converter implemented in a charge-balancing device according to the invention.

FIG. 3 illustrates exemplary laws for controlling the output voltage/output current of a converter 30$i$ for a given value of the input voltage of this converter. Up to Iimax, the continuous curved line corresponds to the case in which the function f(Ii)=K2*Ii. Beyond Iimax, regulation of the output current can be carried out at a constant coefficient (continuous line), at an entrance coefficient or at an exit coefficient, as illustrated.

The operation of the electrical power supply system 1 will now be detailed. For the sake of simplification, the auxiliary battery 5 is not connected to the network 6. It may be assumed that the input voltages across the terminals of the converters have one and the same order of magnitude, notably due to one and the same number of electrochemical accumulator stages connected in series and to identical accumulator technology. The converters 30$i$ subsequently used have an output-current regulation at a constant coefficient, and an output-voltage regulation of the type Vouti=K1*Vei−f (Ii) where f(Ii)=K2*Ii+K3, K3 being a strictly positive constant.

Figure 4:
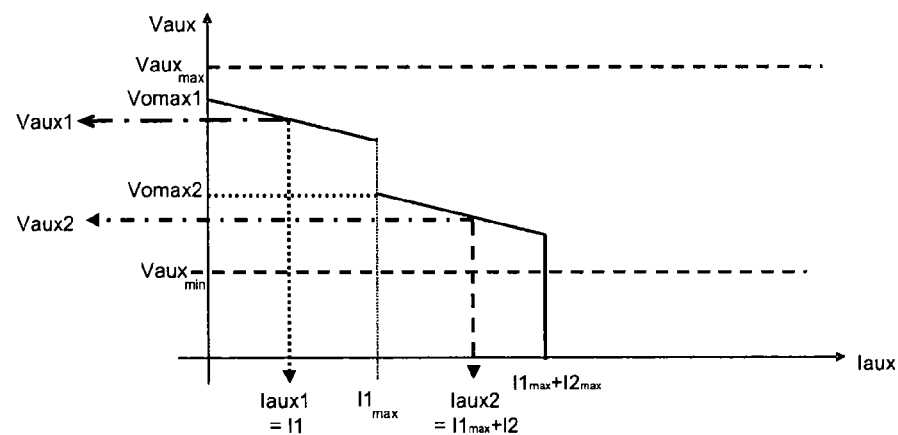
FIG. 4 illustrates a simplified operating mode for a power supply system including two converters to which different input voltages are applied.

The method proposed by the invention for regulating the voltage on the network 6 exploits the tolerance of the level of voltage of the network 6, and potentially of the auxiliary battery 5, the nominal voltages of which can vary from about 10.5 V to 14 V, respectively corresponding to the values Vaux$_{max}$ and Vaux$_{min}$ illustrated in FIG. 4.

The operation detailed in the diagram of FIG. 4 corresponds to a simplified case with only two converters 301 and 302 having one and the same transformation law. The input voltage Ve1 of the converter 301 is greater than the input voltage Ve2 of the converter 302 (the charge state of the accumulators of the stage connected to the input of the converter 301 is greater than the charge state of the accumulators of the stage et2 connected to the input of the converter 302). Consequently, the output voltage Vout1 of the converter 301 is greater than the output voltage Vout2 of the converter 302. The voltage Vomax1 corresponds to the open-circuit output voltage of the converter 301. The voltage Vomax2 corresponds to the open-circuit output voltage of the converter 302.

In a first specific case (dotted arrow), the current I$_{ax}$ drawn by the network 6 is smaller than the limitation I1$_{max}$. The converter 301 thus supplies the entirety of the current I$_{aux1}$ and imposes its output voltage Vout1=Vaux1 as voltage Vaux on the network 6. Here, Vaux1>Vomax2, therefore the converter 302 does not contribute to the current I$_{aux}$.

In a second specific case (discontinuous arrows), the current I$_{aux}$ drawn by the network 6 is greater than the limit I1$_{max}$, but smaller than the limit I1$_{max}$+I2$_{max}$. As I$_{aux}$ is greater than the limit I1$_{max}$, then the output voltage Vout1 falls short of Vomax2 (current regulation of the converter 301). The converter 301 supplies its current I1=I1$_{max}$. The output voltage Vaux drops to a value Vaux2, so that I$_{aux2}$=I1$_{max}$+I2. The converter 302 thus supplies the additional current I2 according to its transformation law (voltage regulation).

The current is thus divided over different stages by prioritizing the discharge of the most charged stages, which contributes to balancing the charges between the stages. Additionally, such balancing is achieved by supplying power to the network 6, the use of such balancing currents thus being optimized so as to limit unwanted losses through dissipation. Furthermore, the greater the difference between the output voltages of the converters the more the supply of the auxiliary current is prioritized by the converter connected to a stage which is the most charged. Furthermore, such a balancing device 3 avoids complex interdependent control loops at the level of the converters, and furthermore avoids resorting to complex communication interfaces adapted to the voltage levels of the different stages.

The converters 301 and 302 here comprise one and the same amperage limit Iimax. Nonetheless, converters having different amperage limits Iimax may of course be used in the framework of the invention.

Figure 5:
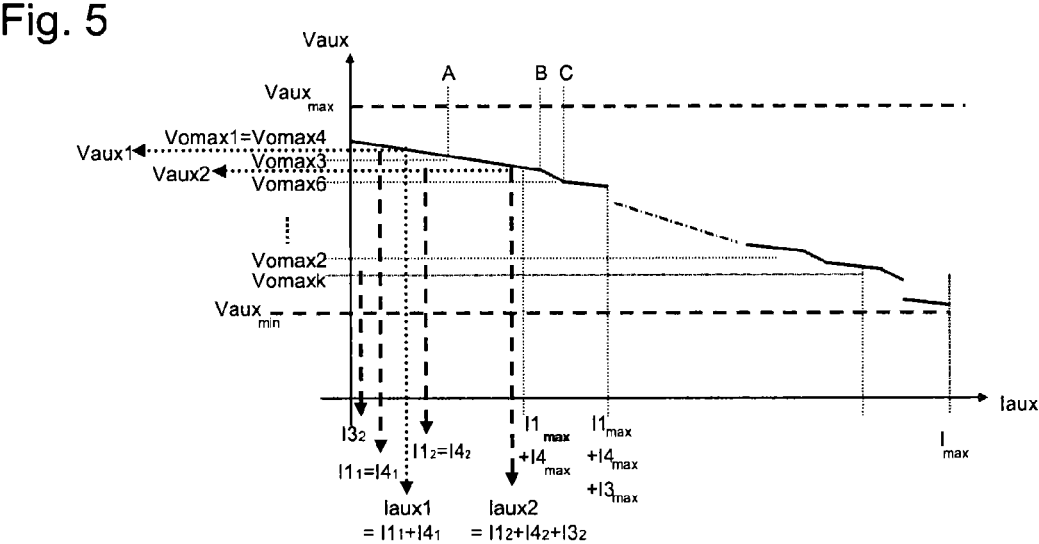
FIG. 5 illustrates an operating mode for a power supply system comprising a greater number of converters at the inputs of which electrochemical accumulators having different charge states are connected.

The operation detailed in the diagram of FIG. 5 corresponds to a more complex case with a large number of converters 30$i$, or a case in which the electrochemical accumulators of the different stages have a slight voltage variation depending on their charge state. In a specific case such as this, an overlap between the output voltages of multiple converters 30$i$ is probable. The converters 30$i$ have one and the same transformation law.

In an area of overlap, the converters are called upon depending on their open-circuit output voltage, depending on their slope of decrease (constant K2) and depending on the auxiliary voltage vaux.

In the example, the converters 1 and 4 are connected to stages at the same charge state and therefore have identical open-circuit voltages Vomax1 and Vomax4. For example, for a current Iaux of between a zero current and the corresponding current at the point A, the converters 301 and 304 each supply identical currents I1 and I4 (determined from the individual transformation law of each of these converters, not illustrated).

For a current Iaux between the point A and the point B, the converters 301, 303 and 304 supply currents divided according to the voltage Vaux, according to the constant K2 and according to their respective open-circuit voltages. The point A is defined as the point for which the voltage Vaux is equal to the open-circuit voltage Vomax3. The converters

301 and 304 each supply a current $I1_2$ ($I4_2$)=equal to (Vomax1−Vaux)/K2. The converter supplies:

$$I3_2 = Iaux2 - I1_2 - I4_2$$

The point B is defined as the point for which the voltage Vaux is equal to Vomax1−K2*I1max.

Between B and C, the converters 301 and 304 each supply identical currents $I1_{max}$ and $I4_{max}$. The converter 303 supplies the additional current to reach a value iout3.

The point C is defined as the point for which the voltage Vaux is equal to the voltage Vomax6.

Thus, in the event of overlapping of the most charged converters, these converters are not called upon independently up to their current limitation.

With a converter 30i for which the transformation law is known, the voltage applied to its input can be determined from its output voltage. The charge state of the stage connected to this input can then be deduced therefrom. Consequently, the charge state of the different stages can be determined by determining at which moments they supply power to the auxiliary network 6.

Furthermore, the monitoring of the voltage of the stages of the power battery 2 can advantageously be achieved through measurements of the output voltages of the converters 30i. Thus, communication between a device for monitoring these voltage levels and a command circuit placed at a low voltage level is facilitated.

Figure 6:
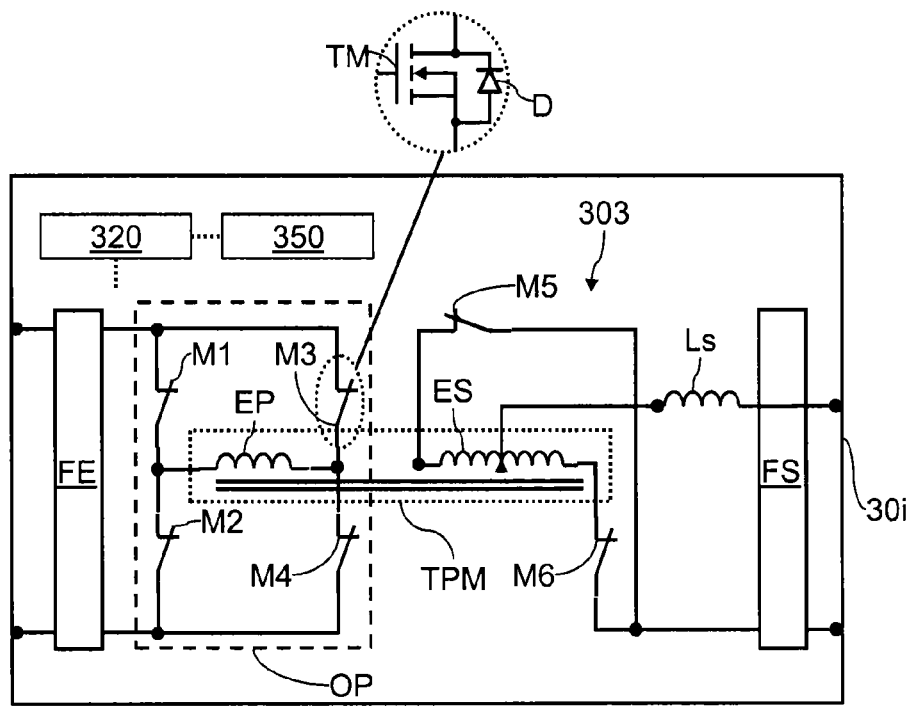
FIG. 6 is a circuit diagram of an exemplary converter able to be implemented within the framework of the invention.

FIG. 6 illustrates an exemplary converter 30i of particular advantage to a balancing device according to invention. The converter 30i comprises an input filter FE connected to the input connection interface. The output of the filter FE is connected to a full-bridge inverter OP of a DC/DC converter circuit 303. The full-bridge inverter includes controlled switches M1, M2, M3 and M4. The DC/DC converter circuit also comprises a transformer with a center tap to the secondary TPM. The transformer TPM comprises a primary winding EP connected in a bridge between the switches M1 to M4. The switches M1 to M4 are controlled by pulse-width modulation via a control circuit 320, in order to define the level of output voltage. The converter 30i furthermore comprises a synchronous rectifier including controlled switches M5 and M6. The secondary winding ES is connected between the switches M5 and M6. The control circuit 320 can itself receive setpoints from a regulator circuit 350, examples of which are subsequently detailed.

The center-tapped transformer TPM makes it possible to minimize the number of switches to the secondary so as to ensure the rectification of the signal. The controlled switches M1 to M6 are controlled by the control circuit 320. The controlled switches M1 to M6 can have the structure illustrated: a transistor TM of nMOS type with a flyback diode D connected in parallel. Such switches M5 and M6 are to be favored in place of a rectification by means of diodes in order to maximize the yield of the converter circuit 303. The use of MOSFET transistors furthermore makes it possible to ensure bidirectional operation of the converter 30i.

An output filter FS is connected at its inputs between the center tap of the secondary winding (by means of a storage inductor Ls) and a node common to the switches M5 and M6. The outputs of the filter FS form the output interface of the converter 30i.

For the implementation of a transformation law of the type Vouti=K1*Vei−f (Ii), a possible operating mode for a converter circuit 303 may be a continuous-conduction mode, such operation being applicable to any bidirectional current converter, for example a converter such as detailed with reference to FIG. 6. For a continuous-conduction mode, the converter circuit 303 may be controlled at a constant duty cycle, as long as the current limit Iimax is not reached.

By application to the converter circuit 303 of FIG. 6, with an input voltage Vei of 50V where f(Ii)=0, a transformation ratio RT of 2/3 for the center-tapped transformer TPM, a duty cycle αiref of conduction for the switches M1, M2, M3 and M4 of 0.2, a regulated output voltage Vouti of Vouti=Vei*RT*αiref=13.3V is obtained, i.e. K1=RT*αiref.

A chopping frequency of 260 KHz for the switches M1, M2, M3 and M4 may for example be used.

Figure 7:
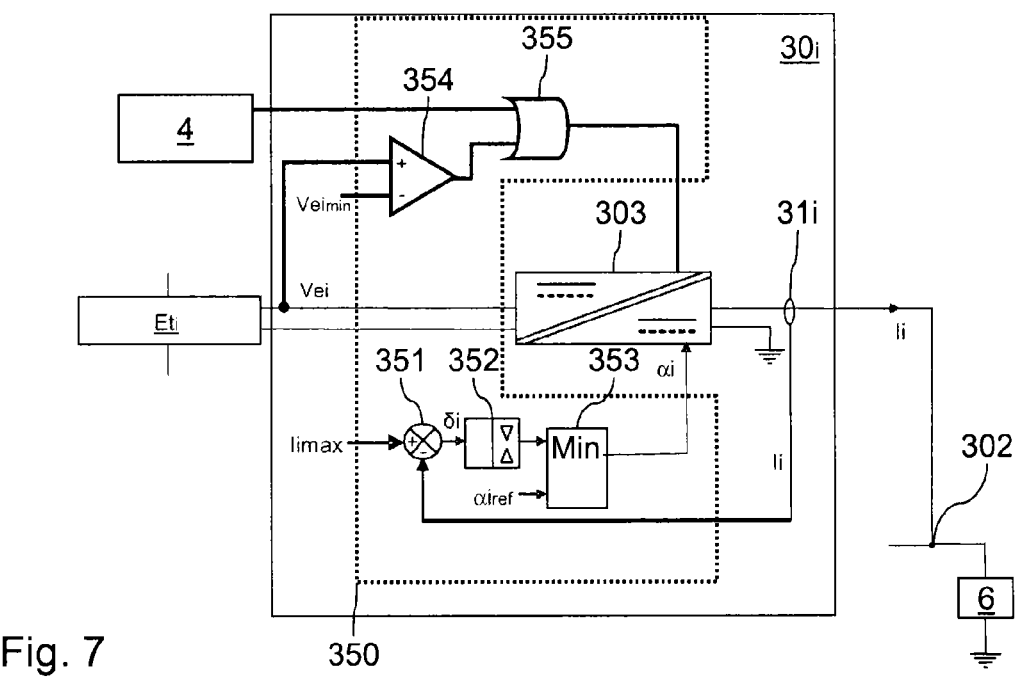
FIG. 7 is an exemplary logic circuit for using a converter in continuous-conduction mode.

FIG. 7 illustrates an exemplary converter 30i intended to implement a continuous-conduction mode. The control circuit is here integrated in the DC/DC converter circuit 303.

The converter 30i includes a DC/DC converter circuit 303 advantageously comprising a galvanic isolation. The converter 30i furthermore comprises a regulator circuit 350. The regulator circuit 350 generates a duty cycle αi the value of which is between 0 and 1. The regulator circuit 350 applies its duty cycle instruction αi to the control circuit of the converter circuit 303. The regulator circuit 350 here does not use a closed loop for voltage regulation, a limitation of the output current proving to be sufficient.

The regulator circuit 350 comprises a subtractor 351 receiving the current Ii measured by the current sensor 31i over an inverting input, and the current Iimax over a non-inverting input. The subtractor 351 thus generates a current differential signal δi so as to implement a closed loop for limiting the current. δi is applied at the input of a corrector 352, intended to formulate a duty cycle value based on this signal, while limiting the value of the formulated duty cycle between a minimum value and a maximum value. This corrector 352 is for example of the PI (proportional integral) type. The output of the corrector 352 is applied at the input of a circuit 353. A reference duty cycle value αiref is furthermore applied to another input of the circuit 353. At the output, the circuit 353 supplies the value αi, equal to the minimum between the two values applied to its input. Thus, as long as the current limitation is not reached or approached, then αi is fixed at the value αiref. The value of αiref defines the open loop for regulating the output voltage. As soon as the current reaches or approaches Iimax, the value αi is defined by the corrector 352 and therefore lowered, in order to decrease the output voltage of the converter circuit 303.

The command circuit 4 here supplies only a binary activation or deactivation signal, applied to an input of an OR gate 355. Another input of the OR gate 355 is connected to the output of a comparator 354. The output signal of the comparator 354 is applied to the converter circuit 303 and thereby makes it possible to activate or deactivate the converter 30i. The comparator 354 makes it possible to activate or deactivate the converter 30i if the voltage applied to its input by the stage Eti is smaller than the lower threshold Veimin.

In this example, f(Ii)=0, but provision can also be made for a decrease of the duty cycle applied to the converter circuit 303, depending on the value Ii measured by the sensor 31i, in order to obtain a decrease of the output voltage with the increase of the value Ii. Thus, converters 30i controlled independently with the same output voltages divide their contribution to the current $i_{aux}$ homogeneously.

Figure 8:
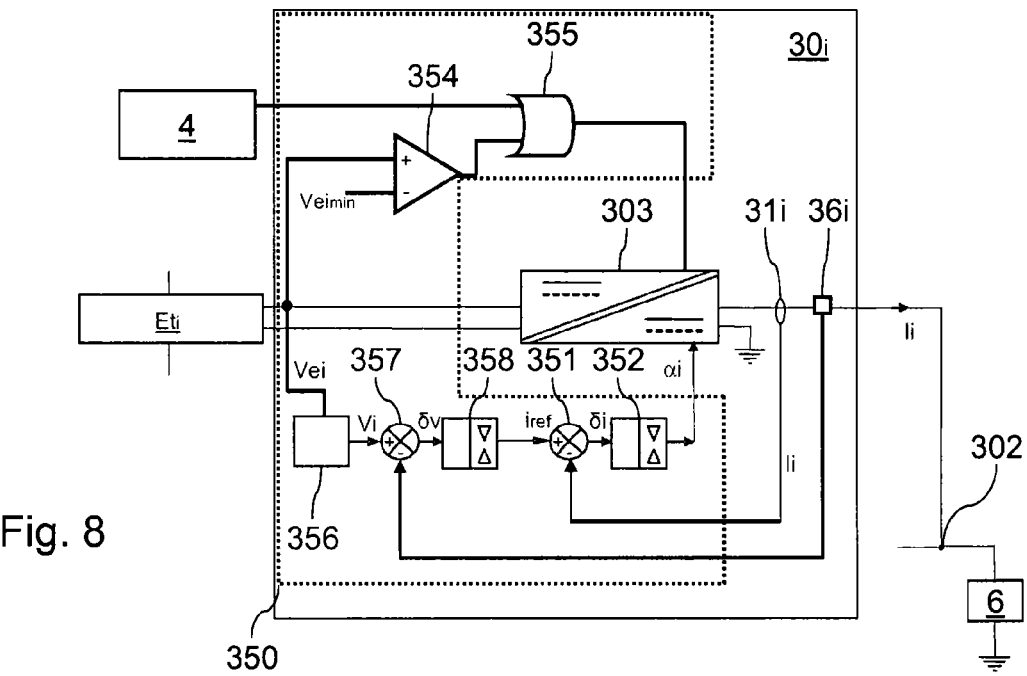
FIG. 8 is an exemplary logic circuit for using a converter in discontinuous-conduction mode.

FIG. 8 illustrates an exemplary converter 30i intended to implement a discontinuous-conduction mode. The control circuit is here integrated in the DC/DC converter circuit 303.

The converter 30i is here based on two nested regulating closed loops. A fast loop makes it possible to monitor the output current Ii. A slow loop regulates the output voltage of the converter 30i.

The converter 30i comprises a regulator circuit 350. The regulator circuit 350 generates a duty cycle αi the value of which is between 0 and 1. The regulator circuit 350 applies its duty cycle instruction αi to the control circuit of the converter circuit 303.

The regulator circuit 350 comprises a subtractor 351 receiving the current Ii measured by the current sensor 31i over an inverting input, and a current Iref (detailed below) over a non-inverting input. The subtractor 351 thus generates a current differential signal δi. δi is applied at the input of a corrector 352, intended to formulate a duty cycle value based on this signal, while limiting the value of the formulated duty cycle between a minimum value and a maximum value. This corrector 352 is for example of the PI (proportional integral) type. The output of the corrector 352 applies the duty cycle αi at a command input of the converter circuit 303.

The regulator circuit 350 comprises a divider receiving the value of the voltage Vei at the input, and generating a voltage value Vi=Vei*K1 at the output. The value Vi is applied to a non-inverting input of a subtractor 357. A voltage sensor 36i measures the output voltage of the converter circuit 303 and applies this voltage value to the inverting input of the subtractor 357. A voltage error signal δv is thus generated. The signal δv is applied at the input of a corrector 358 (for example of PI type). The corrector 358 generates the current instruction iref.

The slow loop is active as long as the current instruction iref is smaller than the value Iimax. When iref reaches the value Iimax, the output current of the converter circuit 303 is limited to Iimax.

As in the example of FIG. 7, the command circuit 4 here supplies only a binary activation or deactivation signal, applied to an input of an OR gate 355. Another input of the OR gate 355 is connected to the output of a comparator 354. The output signal of the comparator 354 is applied to the converter circuit 303.

In this example, f(Ii)=0, provision can also be made for a decrease of the duty cycle applied to the converter circuit 303, depending on the value Ii measured by the sensor 31i.

FIGS. 9 and 10 illustrate exemplary unidirectional converters furthermore having a switch function in series with the DC/DC converter circuit. The switch function makes it possible to isolate the converter in the event of a fault. The unidirectional conduction function is intended to avoid the situation whereby the converter, which has an output voltage smaller than that of the auxiliary network or of another converter to which it is connected, is crossed by a current in the direction of the stage connected to its input.

According to FIG. 9, these functions are ensured in the converters 30k and 30(k-1) by respective Schottky diodes 33k and 33(k-1), connected in series between the output of their converter circuit and the output of their converter.

According to FIG. 10, these functions are ensured by a circuit connected in series between the output of a converter and the output of its converter circuit. The converters 30k and 30(k-1) thus comprise respective circuits 34k and 34(k-1). Each of these circuits 34k et 34(k-1) comprises a MOSFET transistor controlled by a command circuit (not illustrated). This variant makes it possible to limit the losses for implementing these switch and unidirectional conduction functions. The use of a MOFSET transistor also allows a bidirectional current operation.

The invention is advantageously applicable to electrical energy storage devices 2 including electrochemical accumulators for which the variation of voltage across their terminals is substantial during a variation of their residual charge.

The charging and discharging of an accumulator respectively translates into an increase or decrease of the voltage across its terminals. The nominal voltage across the terminals of an electrochemical accumulator is set by the electrochemical characteristics of the materials used. The operating voltage of an accumulator depends on its nominal voltage but also on the current crossing it, on its internal resistance, on its temperature, on its age and on its residual charge. The curves illustrated in FIG. 11 illustrate typical discharges for different electrochemical accumulator technologies discharged at a discharge current of 0.2 C.

A Li-ion accumulator based on iron phosphate (LiFePO4 in FIG. 11) has a typical voltage level which varies little depending on the discharge current: a typically observed variation is of the order of 5.5% with respect to the nominal voltage between 10% and 90% of the residual charge of the accumulator. An accumulator based on lead acid (Pb) has a more pronounced typical variation of the voltage across its terminals (around 10%) for this same charge variation. An alkaline accumulator based on zinc and on manganese dioxide (Zn/MnO2) has an even more pronounced variation of the voltage across its terminals (around 44%) for this same charge variation. A Li-ion accumulator with a positive electrode containing cobalt (NMC, NCA, LiCoO2 . . . ) possesses a typical variation of the voltage across its terminals of around 12% for this same charge variation.

According to an operating mode of the power supply system, the recharging of one or more stages of the battery is achieved. Such a recharging of one or more stages can be ensured via a discharging of one or more other stages having a higher charge state, by means of their respective converters (for example a converter such as detailed with reference to FIG. 6). The converters 30i will then also advantageously have a recharge limit Irimax. FIG. 12 illustrates an exemplary output-voltage/output-current diagram for such a converter 30i. The recharging resistance of the converters 30i is preferentially limited so as to avoid the losses while balancing between stages.

Although not illustrated, the electrical power supply system 1 advantageously comprises a device for measuring and monitoring the voltage across the terminals of the accumulator stages $Et_i$.

The invention claimed is:

1. A device for balancing charge of an electric power storage device comprising:
a plurality of electrical storage elements connected in series comprising:
at least two current-limiting DC/DC converters each comprising:
an input configured to be connected to terminals of a respective storage element;
an output configured to be connected to an electrical network having a voltage regulated at a lower level than a voltage across terminals of the storage device;
a transformation law of type Vout=K1*Ve−f(I) for I≤Iimax, wherein Vout is potential difference at the output, K1 is a constant, Ve is potential difference at the input, f(I) is an affine function of current I drawn at the output, Iimax is current limitation of the converter, and f(Iimax)<K1*Ve;
an operation for regulating the current once I reaches Iimax.

2. The device for balancing charge of an electrical energy power storage device as claimed in claim 1, wherein each of the converters includes a circuit for measuring the current which it draws at its output.

3. The device for balancing charge of an electrical energy power storage device as claimed in claim 2, wherein each of the converters comprises a regulating circuit applying the transformation law as a function of the measured current.

4. The device for balancing charge of an electrical energy power storage device as claimed in claim 2, wherein each of the converters comprises an inductor connected at its output and comprises a regulating circuit maintaining the converter in continuous-conduction mode for as long as the current drawn at the output is lower than Iimax.

5. The device for balancing charge of an electrical energy power storage device as claimed in claim 1, wherein K1 is a constant with a value between 0 and 1.

6. The device for balancing charge of an electrical energy power storage device as claimed in claim 1, wherein f(I) <0.1*K1*Ve.

7. The device for balancing charge of an electrical energy power storage device as claimed in claim 1, wherein the converters are of bidirectional current type.

8. The device for balancing charge of an electrical energy power storage device as claimed in claim 7, wherein the converters each include a transformer with a primary winding connected in a bridge between four switches controlled by pulse-width modulation.

9. The device for balancing charge of an electrical energy power storage device as claimed in claim 8, wherein the transformer is a center-tapped transformer with a secondary winding connected between two controlled switches, the secondary winding comprising a center tap connected to an output of its converter.

10. The device for balancing charge of an electrical energy power storage device as claimed in claim 1, wherein f(I) is an affine function which is strictly positive when the output of the corresponding converter draws a current.

11. The device for balancing charge of an electrical energy power storage device as claimed in claim 1, wherein the values K1, wherein Iimax and the function f(I) are identical for each of the DC/DC converters.

12. An electrical power supply system, comprising:
 a device for balancing charge of an electrical energy power storage device as claimed in claim 1;
 an electrical power storage device including a plurality of electrical storage elements being connected to respective converters of the device for balancing charge;
 an electrical network connected to the output of the device for balancing charge and having a voltage regulated at a lower level than the voltage across the terminals of the storage device.

13. The system as claimed in claim 12, wherein the electrical storage elements are electrochemical accumulators in which variation of voltage between 90% and 10% of their charge state is at least equal to 10% of their nominal voltage.

14. The device for balancing charge of an electrical energy power storage device as claimed in claim 1, wherein each of the converters includes a regulating circuit, the regulating circuit configured to only apply a fixed K constant.

* * * * *